US008676580B2

(12) United States Patent
Deshmukh et al.

(10) Patent No.: US 8,676,580 B2
(45) Date of Patent: Mar. 18, 2014

(54) AUTOMATIC SPEECH AND CONCEPT RECOGNITION

(75) Inventors: Om D. Deshmukh, New Delhi (IN);
Etienne Marcheret, White Plains, NY (US); Shajith I. Mohamed, Karnataka (IN); Ashish Verma, New Delhi (IN); Karthik Visweswariah, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 13/210,471

(22) Filed: Aug. 16, 2011

(65) Prior Publication Data

US 2013/0046539 A1     Feb. 21, 2013

(51) Int. Cl.
*G10L 15/00*     (2013.01)
*G10L 17/00*     (2013.01)
*G10L 15/14*     (2006.01)
*G06F 17/27*     (2006.01)

(52) U.S. Cl.
USPC ........... 704/239; 704/231; 704/236; 704/244; 704/257; 704/252; 704/251; 704/9; 704/249; 704/255; 704/240; 704/243; 704/235; 704/256.5

(58) Field of Classification Search
USPC ................................................ 704/231–257
See application file for complete search history.

(56) References Cited

U.S. PATENT DOCUMENTS

| 5,625,749 | A | | 4/1997 | Goldenthal et al. |
| 6,081,779 | A | * | 6/2000 | Besling et al. ................ 704/257 |
| 6,167,377 | A | * | 12/2000 | Gillick et al. ................. 704/240 |
| 6,334,102 | B1 | * | 12/2001 | Lewis et al. .................... 704/255 |
| 6,754,625 | B2 | * | 6/2004 | Olsen et al. .................... 704/235 |
| 6,823,307 | B1 | * | 11/2004 | Steinbiss et al. ............... 704/252 |
| 6,973,427 | B2 | * | 12/2005 | Hwang et al. ................. 704/249 |
| 7,043,422 | B2 | * | 5/2006 | Gao et al. .......................... 704/9 |
| 7,251,600 | B2 | * | 7/2007 | Ju et al. ......................... 704/257 |
| 7,676,367 | B2 | * | 3/2010 | Roth et al. ..................... 704/252 |
| 7,711,561 | B2 | * | 5/2010 | Hogenhout et al. ........ 704/256.5 |
| 7,716,049 | B2 | * | 5/2010 | Tian ............................... 704/251 |
| 7,747,437 | B2 | * | 6/2010 | Verhasselt et al. ............ 704/257 |
| 7,809,575 | B2 | | 10/2010 | Ativanichayaphong et al. |
| 7,831,427 | B2 | | 11/2010 | Potter et al. |
| 7,848,927 | B2 | * | 12/2010 | Ohno et al. .................... 704/255 |
| 7,925,505 | B2 | * | 4/2011 | Wu ............................... 704/236 |
| 8,019,602 | B2 | * | 9/2011 | Yu et al. ........................ 704/231 |
| 8,041,568 | B2 | * | 10/2011 | Strope et al. .................. 704/257 |

(Continued)

OTHER PUBLICATIONS

Manna et al., Semantic Hierarchical Document Signature for Determining Sentence Similarity, Fuzzy Systems (FUZZ), 2010 IEEE International Conference, Jul. 2010.

(Continued)

*Primary Examiner* — Pierre-Louis Desir
*Assistant Examiner* — Anne Thomas-Homescu
(74) *Attorney, Agent, or Firm* — Ryan, Mason & Lewis, LLP

(57) ABSTRACT

A method, an apparatus and an article of manufacture for automatic speech recognition. The method includes obtaining at least one language model word and at least one rule-based grammar word, determining an acoustic similarity of at least one pair of language model word and rule-based grammar word, and increasing a transition cost to the at least one language model word based on the acoustic similarity of the at least one language model word with the at least one rule-based grammar word to generate a modified language model for automatic speech recognition.

20 Claims, 2 Drawing Sheets

(56) References Cited

U.S. PATENT DOCUMENTS

| | | | |
|---|---|---|---|
| 8,131,548 B2* | 3/2012 | Blass et al. | 704/257 |
| 8,239,200 B1* | 8/2012 | Brants | 704/257 |
| 8,280,733 B2* | 10/2012 | Yu et al. | 704/231 |
| 8,340,958 B2* | 12/2012 | Gruhn et al. | 704/9 |
| 8,447,600 B2* | 5/2013 | Cohen et al. | 704/231 |
| 8,532,990 B2* | 9/2013 | Hillebrecht et al. | 704/243 |
| 2002/0013705 A1 | 1/2002 | Jaepel et al. | |
| 2005/0159949 A1* | 7/2005 | Yu et al. | 704/235 |
| 2007/0118374 A1* | 5/2007 | Wise et al. | 704/235 |
| 2007/0233487 A1* | 10/2007 | Cohen et al. | 704/255 |
| 2008/0103775 A1* | 5/2008 | Jouvet et al. | 704/257 |
| 2008/0126089 A1 | 5/2008 | Printz et al. | |
| 2008/0255839 A1 | 10/2008 | Larri et al. | |
| 2009/0024392 A1* | 1/2009 | Koshinaka | 704/257 |
| 2009/0099841 A1* | 4/2009 | Chen | 704/9 |
| 2009/0313017 A1* | 12/2009 | Nakazawa et al. | 704/244 |
| 2010/0049514 A1* | 2/2010 | Kennewick et al. | 704/233 |
| 2010/0063819 A1* | 3/2010 | Emori | 704/251 |
| 2010/0217596 A1* | 8/2010 | Morris et al. | 704/251 |
| 2011/0054899 A1* | 3/2011 | Phillips et al. | 704/235 |
| 2011/0137653 A1* | 6/2011 | Ljolje et al. | 704/255 |
| 2012/0022867 A1* | 1/2012 | Ballinger et al. | 704/235 |
| 2013/0246065 A1* | 9/2013 | Cohen et al. | 704/244 |

OTHER PUBLICATIONS

Kirchhoff, Integrating Articulatory Features into Acoustic Models for Speech Recognition, Phonus 5, Institute of Phonetics, University of the Saarland, 2000, 73-86.

Nagai et al., Integration of Concept-Driven Semantic Interpretation with Speech Recognition, Acoustics, Speech, and Signal Processing, 1996. ICASSP-96. Conference Proceedings, 1996 IEEE International Conference. May 1996.

Ward et al., A Class Based Language Model for Speech Recognition, In Proc. Int. Conf. on Acoustics, Speech, and Signal Processing, 1996, pp. 416-418.

Hetherington, A Multi-Pass, Dynamic-Vocabulary Approach to Real-Time Large-Vocabulary Speech Recognition, in Proc. of Interspeech, Lisbon, Portugal, Sep. 2005, pp. 545-548.

Wang et al., A Unified Context-Free Grammar and N-Gram Model for Spoken Language Processing, In Proc. Int. Conf. on Acoustics, Speech, and Signal Processing, Istanbul, Turkey, Jun. 2000, pp. 1639-1642.

Hebert, Generic Class-Based Statistical Language Models for Robust Speech Understanding in Directed Dialog Applications, in Proc. of Interspeech, Antwerp, Belgium, 2007, pp. 2809-2812.

Paek et al., Handling Out-of-Grammar Commands in Mobile Speech Interaction Using Backoff Filler Models, in Proc. of ACL Workshop on Grammar-Based Approaches to Spoken Language Processing, Prague, Czech Republic, 2007, pp. 33-40.

Printz et al., Theory and Practice of Acoustic Confusability, Computer Speech and Language, pp. 1-34, 2001.

Chen et al., Word Confusability—Measuring Hidden Markov Model Similarity, in Proc. of Interspeech, Antwerp, Belgium, Aug. 2007, pp. 2089-2092.

You et al., A Statistical Acoustic Confusability Metric Between Hidden Markov Models, in Proc. Int. Conf. on Acoustics, Speech, and Signal Processing, Honolulu, Hawaii, 2007.

Chaudhari et al., Improved Vocabulary Independent Search with Approximate Match Based on Conditional Random Fields, in IEEE Automatic Speech Recognition and Understanding Workshop, Merano, Italy, Dec. 2009, pp. 416-420.

* cited by examiner

| LM WORD | λ SCORE | SIMILAR EG WORDS |
|---|---|---|
| SCHEDULING | 0.83 | SCHEDULES/SCHEDULE |
| TRAIN | 0.74 | TRAIN/TRIP |
| AGENCY | 0.51 | AGENT/CUSTOMER |
| TOLD | 0.36 | TRAIN/HELP |
| WOULD | 0.19 | PRICE/SCHEDULE |

AUTOMATIC SPEECH AND CONCEPT RECOGNITION

FIELD OF THE INVENTION

Embodiments of the invention generally relate to information technology, and, more particularly, to speech recognition.

BACKGROUND OF THE INVENTION

At any given stage of an interaction between a directed-dialog application and a user, it is often easier to guess the user's intention than the exact choice of words in the user's response. For example, when a user calls in to an Interactive Voice Response (IVR) system of a railway, it can be surmised that (s)he is most likely interested in one of the following: a train status, a reservation, a fare, an agent, or something else. However, it is more difficult to guess how (s)he will phrase the query. The challenge is compounded by the disfluencies (fillers, false starts, repetitions, etc.) inherently present in human speech. Thus, using an Automatic Speech Recognition (ASR) system based on a set of rule-based grammars that enumerate all of the possible user responses is cumbersome and sub-optimal. At the same time, using a standard large-vocabulary Language Model (LM) would also be sub-optimal, as it does not take advantage of the restricted set of words and phrases from which the user can choose. In such situations, a class-LM is typically used.

Class-LMs are similar to standard LMs except for the following difference: some of the entries in class-LMs are tokens/classes that contain one or more words or phrases that typically either occur in similar context or convey the same meaning. Also, with class-LMs, entries can be added to the classes (referred to as fanout-increase) without the need to retrain the LM. Classes can be transferred from one dialog system to other, and class-LMs typically need less data to train than standard LMs.

However, in ASR systems in typical IVR setups that include a class-LM, a challenge exists, given a set of classes (or embedded grammars), in determining an optimal way to embed the classes/grammars in the LM.

SUMMARY OF THE INVENTION

In one aspect of the present invention, techniques for automatic speech and concept recognition are provided. An exemplary computer-implemented method for automatic speech recognition can include steps of obtaining at least one language model word and at least one rule-based grammar word, determining an acoustic similarity of at least one pair of language model word and rule-based grammar word, and increasing a transition cost to the at least one language model word based on the acoustic similarity of the at least one language model word with the at least one rule-based grammar word to generate a modified language model for automatic speech recognition.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figures 1, 2:
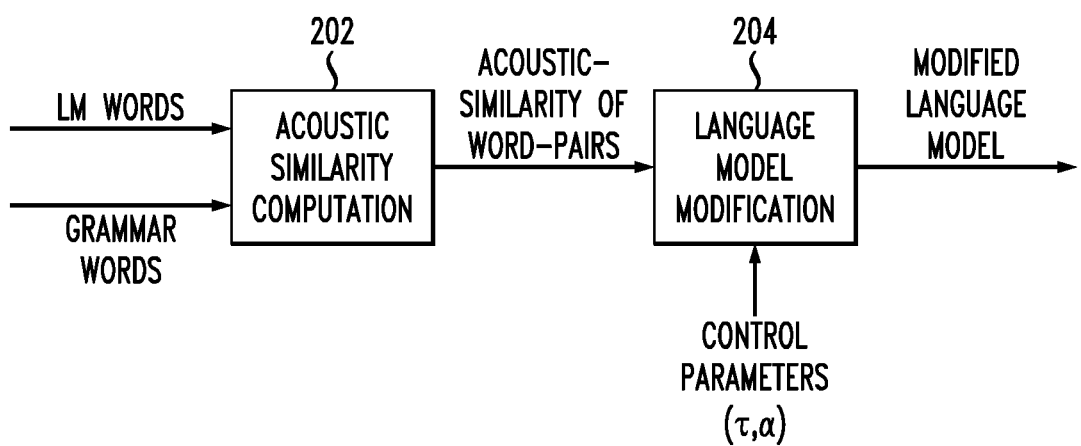
FIG. 1 is a table illustrating an example acoustic similarity computation, according to an embodiment of the present invention.
FIG. 2 is a block diagram illustrating an example embodiment, according to an aspect of the invention.

As described herein, an aspect of the present invention includes automatic speech and concept recognition using acoustic-similarity based techniques. By way of example, an embodiment of the invention includes using an acoustic-similarity based technique to improve the recognition of in-grammar utterances in typical directed-dialog applications where the Automatic Speech Recognition (ASR) system includes at least one class grammar embedded in the Language Model (LM). The techniques detailed herein increase the transition cost of LM paths by a value proportional to the average acoustic similarity between that LM path and all of the in-grammar utterances.

As used herein, classes are referred to as Embedded Grammars (EG), and the class entries are referred to as "in-grammar" utterances. Additionally terminology used herein includes Good Slot Good Value (GSGV), Good Slot Wrong Value (GSWV), Good Slot Slot Deleted (GSSD), No Slot No Slot (NSNS), and No Slot Slot Inserted (NSSI). NSSI and GSWV contribute to False Accepts (FAs). Additionally, to control FA, an aspect of the invention includes increasing the threshold on ASR-confidence. NSSI and GSWV instances with low ASR-confidence will be re-labeled as NSNS and GSSD, respectively, which will result in a drop in FA. Also, GSGV instances with low ASR-confidence will be re-labeled as GSSD, which will result in a drop in Correct Accept (CA).

As described herein, an aspect of the invention includes increasing the likelihood of grammar-paths being chosen over the bypassing LM paths at the time of decoding. This is achieved, as noted, by selectively increasing the transition costs of LM words that are acoustically similar to at least one in-grammar word. One embodiment of the invention can thus be thought of, for example, as a LM-penalizing technique.

In contrast to existing approaches, the techniques detailed herein provide an acoustic-confusability based technique to improve concept recognition performance without the need to change the grammar and LM in the ASR. Also, non-concept words in the LM are penalized based on their acoustic-similarity to the concept words in the grammar, and the penalty on the LM words is only based on the relative number of words in the LM and the grammar. As used herein, concept words are words that are important to guide the navigation of the IVR system while non-concept words are the words that need not necessarily dictate the navigation of the IVR but can be commonly spoken by the user (examples include disfluencies, filler words, etc.). Further, the number of words penalized in the LM depends only on the concept words in the grammar.

As also described herein, an aspect of the invention includes an acoustic similarity based increase in transition costs of LM paths. Given a LM word, W, the Acoustic Similarity (AS) between W and each of the path-initial words of the EG paths is computed. An example algorithm to compute acoustic similarity can be based on Conditional Random Fields (CRFs) and is described later herein in detail. The similarity computation can be any relevant black box that takes pairs of phone level baseforms and returns a similarity value as long as it satisfies the following constraints: (a) it is in the range 0-1, (b) a higher value implies more acoustic similarity, and (c) the value is 1 if and only if the baseforms of the pair are exactly the same.

By way of example, assume the acoustic similarity values for the language model word W are $A(W, e_1), A(W, e_2), \ldots, A(W, e_k)$, where it is assumed that there are k unique EG-path-initial words. The average of the top N (which could be one or more) values is the average acoustic similarity of W (called $\lambda_w$) with the EG. A goal is to increase the transition cost to the LM word based on how high the $\lambda_w$ value is. Further, assume that the transition cost assigned by the LM training procedure to the word W is $\omega_o$. The new transition cost $\omega_n$ is controlled by a set of two parameters: $\Lambda=\{\tau, \alpha\}$, where $\tau$ is the threshold on $\lambda_w$ that decides whether the word qualifies as 'acoustically strongly similar' or not. The parameter $\alpha$ is the extra cost factor applied to the 'acoustically strongly similar' words. $\tau$ and $\alpha$ can each take values over the range 0-1 and are independent of each other. Additionally, two scenarios arise based on the relative values of $\lambda_w$ and $\tau$:

1. If $\lambda_w > \tau$, W qualifies as acoustically strongly similar and the new transition cost for W is calculated as: $\omega_n=\omega_o-\log(\alpha*(1-\lambda_w))$. For example, $\lambda_w$ is assumed to be 0.8 (that is, high acoustic similarity with EG) and $\alpha$ to be 1, the transition cost goes up by a factor of $-\log(0.2)=1.61$. On the other hand, if $\lambda_w$ is 0.2, the transition cost goes up by only $-\log(0.8)=0.22$. As $\alpha$ is reduced from 1, the transition cost goes up by an extra factor of $\log(\alpha)$.

2. If $\lambda_w \leq \tau$, W is not considered acoustically strongly similar and there is no change in its transition cost (that is, $\omega_n=\omega_o$).

The acoustic similarity computation technique used in an embodiment of the invention includes a Conditional Random Field (CRF)-based technique. A CRF is trained to model confusions and account for errors in the phonetic decoding derived from an ASR output. The training data for the CRF includes pairs of input and output phone sequences corresponding to the reference phone sequence and the decoded phone sequence, respectively.

In an aspect of the invention, the CRF training data is $D=\{DP^{(i)}, AP^{(i)}\}_{i=1}^{N}$, where each $DP^{(i)}=\{DP_1^{(i)}, DP_2^{(i)}, \ldots, DP_n^{(i)}\}$ is the phone sequence of a recognized word, $AP^{(i)}=\{AP_1^{(i)}, AP_2^{(i)}, \ldots, AP_n^{(i)}\}$ is the phone sequence of the corresponding ground truth word and N is the total number of word pairs in the training data. The CRF is trained to model the distribution: $P(AP|DP)$. To incorporate the effect of phonetic context, a variety of features are used include, for example, the identity of the current decoded phone, identity of up to ±3 adjacent decoded phones.

During evaluation, given the phone sequences $\{X_T, Y_T\}$ of two words, the marginal of predicting $Y_\tau$ given $X_\tau$ is computed. A higher marginal implies more acoustic similarity between the two words. However, these marginals cannot be directly used as similarity scores. For example, consider the marginals for the following four pairs: M(IY,IY)=12.22, M(UW,UW)=10.817, M(UW,IY)=0.102, M(IY,UW)=5.1. The score is a high positive number when the two phone strings are identical and drops gradually as the dissimilarity increases. Note that these scores are not symmetric and their dynamic range is not fixed. The following normalization ensures that the scores are symmetric with a dynamic range of $\{0\text{-}1\}$:

$$A(X, Y) = \frac{1}{2}\left[\frac{M(X, Y)}{M(X, X)} + \frac{M(Y, X)}{M(Y, Y)}\right]$$

FIG. 1 is a table 102 illustrating an example acoustic similarity computation, according to an embodiment of the present invention. Table 102 includes example LM words and EG words from a dataset related to train schedules and fares. Additionally, at $\tau$=0.8, only the word 'scheduling' qualifies as 'acoustically strongly similar' (refer FIG. 1) and its transition cost changes from $W_o$=7.5 to $W_n$=8.63. Similarly at $\tau$=0.7, two words, 'scheduling' and 'train,' qualify as acoustically strongly similar and their transition costs change from $W_o$=7.54 to $W_n$=8.63 and from $W_o$=5.38 to $W_n$=5.95, respectively.

Further, an aspect of the invention also includes computing and incorporating ASR-confidence. In computing ASR-confidence, the confidence is defined as a function of the ratio of the overall likelihood of the first best ASR output and that of the second-best output. Thus, if the top 2-best outputs have a similar likelihood, the ASR-confidence is going to be quite low. It is also reasonable to expect that the top-N ASR outputs would have substantial acoustic similarity among themselves. One embodiment of the invention specifically reduces the likelihood of utterances that are acoustically similar to in-grammar utterances and thus directly boosts the ASR-confidence of such in-grammar utterances.

Further, although the exact optimal combination varies across fanouts, there is also a noticeable trend in values of $\tau$ and $\alpha$. As the fanout increases, the $\lambda_w$ values of the LM words will either remain the same or increase. Accordingly, the optimal threshold $\tau$ to select acoustically strongly similar LM words should increase as the fanout increases. For example, in one embodiment of the invention, the optimal value of $\tau$ at fanout 4000 is 0.7, while it gradually drops down to around 0.3 for lower fanouts. The parameter $\alpha$ decides the extra cost penalty applied to the acoustically strongly similar LM words. At higher fanouts, the entry costs to the grammar utterances are high (function of $-\log(1/\text{fanout-size})$) and thus the extra cost penalty to be applied to the LM words should also be higher. For instance, in one embodiment of the invention, the optimal $\alpha$ value for lower fanouts is around 0.4, while it is around 0.1 for higher fanouts.

FIG. 2 is a block diagram illustrating an example embodiment, according to an aspect of the invention. By way of illustration, FIG. 2 depicts LM words and grammar words being input to an acoustic similarity computation module 202, which outputs acoustic-similarity of word pairs to a language model modification module 204. The language model modification module 204 also receives control parameters ($\tau$ and $\alpha$), and ultimately outputs a modified language model.

Figure 3:
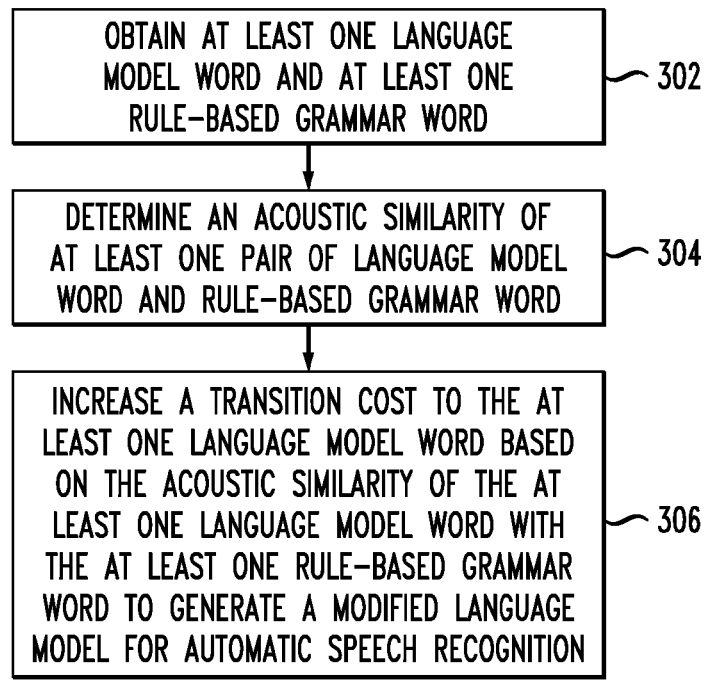
FIG. 3 is a flow diagram illustrating techniques for automatic speech recognition, according to an embodiment of the invention.

FIG. 3 is a flow diagram illustrating techniques for automatic speech recognition, according to an embodiment of the present invention. Step 302 includes obtaining at least one language model word and at least one rule-based grammar word. Step 304 includes determining an acoustic similarity of at least one pair of language model word and rule-based grammar word. This step can be carried out, for example, using an acoustic similarity computation module. The acoustic similarity includes a range of 0 to 1, wherein a higher value implies more acoustic similarity, and wherein the acoustic similarity is 1 only if baseforms of the at least one pair of language model word and rule-based grammar word are identical.

Additionally, determining an acoustic similarity of at least one pair of language model word and rule-based grammar word can include using a conditional random field-based technique, wherein a conditional random field is trained to model confusions and account for errors in a phonetic decoding derived from an automatic speech recognition output. Training data for the conditional random field includes pairs of input and output phone sequences corresponding to a reference phone sequence and a decoded phone sequence, respectively.

Step 306 includes increasing a transition cost to the at least one language model word based on the acoustic similarity of the at least one language model word with the at least one rule-based grammar word to generate a modified language model for automatic speech recognition. This step can be carried out, for example, using a language model modification module. Increasing a transition cost to the language model word based on the acoustic similarity of the language model word with rule-based grammar word includes computing the increase in the transition cost as a function of the acoustic similarity.

The techniques depicted in FIG. 3 also include down-weighing (that is, penalizing) a language model word (that is, the $\alpha$ parameter) as a function of branching size of the language model and a number of entries in embedded grammar. The number of language model words to be down-weighed (that is, the $\tau$ parameter) is a function of actual entries in language model paths and grammar paths. Additionally, embodiments of the invention include penalizing a non-concept word in the language model based on acoustic-similarity to at least one concept word in the at least one rule-based grammar word. Also, a penalty on the non-concept word in the language model is based on a relative number of words in the language model and grammar. As the number of entries in the grammar increases, the penalty on the acoustically similar language model words also increases.

The techniques depicted in FIG. 3 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include an acoustic similarity computation module and a language model modification module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
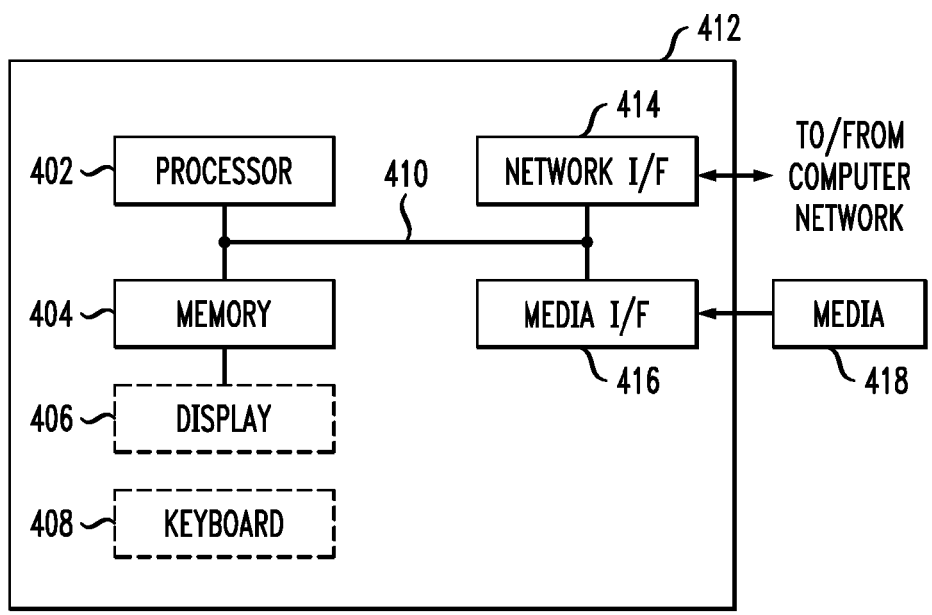
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 2. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, improving concept recognition performance without the need to change the grammar and LM in an ASR.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatic speech recognition, wherein the method comprises:
    obtaining at least one language model word;
    determining an acoustic similarity between the at least one language model word and each rule-based grammar word in a set of multiple rule-based grammar words; and
    increasing a transition cost to the at least one language model word proportionally to the acoustic similarity between the at least one language model word and at least one of the multiple rule-based grammar words to generate a modified language model for automatic speech recognition, wherein said increasing the transition cost to the at least one language model word comprises increasing a likelihood of selecting at least one of the multiple rule-based grammar words over the at least one language model word as a recognition output;
    wherein at least one of the steps is carried out by a computer device.

2. The method of claim 1, wherein increasing a transition cost to the at least one language model comprises computing the increase in the transition cost as a function of the acoustic similarity.

3. The method of claim 1, further comprising down-weighing a language model word as a function of branching size of the language model and a number of entries in embedded grammar.

4. The method of claim 3, wherein a number of language model words to be down-weighed is a function of actual entries in language model paths and grammar paths.

5. The method of claim 1, further comprising penalizing a non-concept word in the language model based on acoustic-similarity to at least one concept word in the at least one rule-based grammar word.

6. The method of claim 5, wherein a penalty on the non-concept word in the language model is based on a relative number of words in the language model and grammar.

7. The method of claim 1, wherein the acoustic similarity comprises a range of 0 to 1, wherein a higher value implies more acoustic similarity, and wherein the acoustic similarity is 1 only if baseforms of at least one pair of language model word and rule-based grammar word are identical.

8. The method of claim 1, wherein said determining comprises using a conditional random field-based technique, wherein a conditional random field is trained to model at least one confusion and account for at least one error in a phonetic decoding derived from an automatic speech recognition output.

9. The method of claim 8, wherein training data for the conditional random field comprises at least one pair of input and output phone sequences corresponding to a reference phone sequence and a decoded phone sequence, respectively.

10. The method of claim 1, further comprising:
    providing a system, wherein the system comprises at least one distinct software module, each distinct software module being embodied on a tangible computer-readable recordable storage medium, and wherein the at least one distinct software module comprises an acoustic similarity computation module and a language model modification module executing on a hardware processor.

11. An article of manufacture comprising a computer readable storage medium having computer readable instructions tangibly embodied thereon which, when implemented, cause a computer to carry out a plurality of method steps comprising:

obtaining at least one language model word;

determining an acoustic similarity between the at least one language model word and each rule-based grammar word in a set of multiple rule-based grammar words; and increasing a transition cost to the at least one language model word proportionally to the acoustic similarity between the at least one language model word and at least one of the multiple rule-based grammar words to generate a modified language model for automatic speech recognition, wherein said increasing the transition cost to the at least one language model word comprises increasing a likelihood of selecting at least one of the multiple rule-based grammar words over the at least one language model word as a recognition output.

12. The article of manufacture of claim 11, wherein the computer readable instructions which, when implemented, further cause a computer to carry out a method step comprising:

down-weighing a language model word as a function of branching size of the language model and a number of entries in embedded grammar.

13. The article of manufacture of claim 11, wherein the computer readable instructions which, when implemented, further cause a computer to carry out a method step comprising:

penalizing a non-concept word in the language model based on acoustic-similarity to at least one concept word in the at least one rule-based grammar word.

14. The article of manufacture of claim 11, wherein said determining comprises using a conditional random field-based technique, wherein a conditional random field is trained to model at least one confusion and account for at least one error in a phonetic decoding derived from an automatic speech recognition output.

15. The article of manufacture of claim 14, wherein training data for the conditional random field comprises at least one pair of input and output phone sequences corresponding to a reference phone sequence and a decoded phone sequence, respectively.

16. A system for automatic speech recognition, comprising:

at least one distinct software module, each distinct software module being embodied on a tangible computer-readable medium;

a memory; and at least one processor coupled to the memory and operative for:

obtaining at least one language model word;

determining an acoustic similarity between the at least one language model word and each rule-based grammar word in a set of multiple rule-based grammar words; and increasing a transition cost to the at least one language model word proportionally to the acoustic similarity between the at least one language model word and at least one of the multiple rule-based grammar words to generate a modified language model for automatic speech recognition, wherein said increasing the transition cost to the at least one language model word comprises increasing a likelihood of selecting at least one of the multiple rule-based grammar words over the at least one language model word as a recognition output.

17. The system of claim 16, wherein the at least one processor coupled to the memory is further operative for:

down-weighing a language model word as a function of branching size of the language model and a number of entries in embedded grammar.

18. The system of claim 16, wherein the at least one processor coupled to the memory is further operative for:

penalizing a non-concept word in the language model based on acoustic-similarity to at least one concept word in the at least one rule-based grammar word.

19. The system of claim 16, wherein the at least one processor coupled to the memory operative for said determining is further operative for using a conditional random field-based technique, wherein a conditional random field is trained to model at least one confusion and account for at least one error in a phonetic decoding derived from an automatic speech recognition output.

20. The system of claim 19, wherein training data for the conditional random field comprises at least one pair of input and output phone sequences corresponding to a reference phone sequence and a decoded phone sequence, respectively.

* * * * *